(12) United States Patent
Leake et al.

(10) Patent No.: US 8,875,288 B2
(45) Date of Patent: Oct. 28, 2014

(54) TAINT TRACKING MECHANISM FOR COMPUTER SECURITY

(71) Applicant: Edward N. Leake, Mountain View, CA (US)

(72) Inventors: Edward N. Leake, Mountain View, CA (US); Geoffrey Pike, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 13/914,291

(22) Filed: Jun. 10, 2013

(65) Prior Publication Data

US 2014/0033309 A1 Jan. 30, 2014

Related U.S. Application Data

(63) Continuation of application No. 11/529,796, filed on Sep. 29, 2006, now Pat. No. 8,510,827.

(60) Provisional application No. 60/747,640, filed on May 18, 2006.

(51) Int. Cl.
  *G06F 21/00* (2013.01)
  *G06F 21/55* (2013.01)
  *G06F 12/14* (2006.01)
  *G06F 21/53* (2013.01)

(52) U.S. Cl.
  CPC .............. *G06F 21/55* (2013.01); *G06F 21/552* (2013.01); *G06F 12/1416* (2013.01); *G06F 21/53* (2013.01)
  USPC ................... 726/22; 726/23; 726/24; 726/25; 726/26

(58) Field of Classification Search
  USPC ....................................... 726/22–26
  See application file for complete search history.

(56) References Cited

U.S. PATENT DOCUMENTS

| | | | |
|---|---|---|---|
| 6,243,860 | B1 | 6/2001 | Holland |
| 7,428,636 | B1 | 9/2008 | Waldspurger et al. |
| 2005/0015752 | A1 | 1/2005 | Alpern et al. |
| 2005/0273854 | A1* | 12/2005 | Chess et al. ..................... 726/22 |
| 2007/0156986 | A1 | 7/2007 | Neiger et al. |

OTHER PUBLICATIONS

Smith, J.E. et al., "An Overview of Virtual Machine Architectures" Elsevier Science, Nov. 1, 2003, pp. 1-21.
Abadi M. et al., "Control-Flow Integrity," Microsoft Technical Report MSR-TR-05-18, pp. 340-353, (Oct. 2005).
Garfinkel T. et al., "Terra: A Virtual Machine-Based Platform for Trusted Computing," Copyright 2003 ACM, pp. 193-206, Oct. 19-22, 2003.
Kiriansky V. et al., "Secure Execution Via Program Shepherding," Proceeding of the 11th UNENIX Security Symposium (2002).

(Continued)

*Primary Examiner* — Ghazal Shehni

(57) ABSTRACT

A system that includes a memory and processor is provided. The processor is programmed to receive input data, determine that the input data is tainted, store the tainted input data in a location in the memory, and based on storing the tainted input data in the location, label the location as a tainted location. The processor is further programmed to assign a triggering event to the tainted location such that an action is initiated when the triggering event has occurred.

13 Claims, 7 Drawing Sheets

(56) References Cited

OTHER PUBLICATIONS

Suh G. E. et al., "Secure Program Execution via Dynamic Information Flow Tracking," Proceedings of the 11th international Conference on Architectural Support for Programming Languages and Operating Systems (2004), pp. 85-96.

Chow J., et al., "Understanding Data Lifetime via Whole System Simulation," Proceedings of the 13th USENIX Security Symposium, 17 pages (Aug. 2004).

Newsome J., et al., "Dynamic Taint Analysis for Automatic Detection, Analysis, and Signature Generation of Exploits on Commodity Software," School of Computer Science, Carnegie Mellon University, Pittsburgh, PA, CMU-CS-04-140, (Last updated Jul. 2005), pp. 1-38.

Newsome J., et al., "Vulnerability-Specific Execution Filtering for Exploit Prevention on Commodity Software," School of Computer Science, Carnegie Mellon University, Pittsburgh, PA, CMU-CS-05-169, (Last modified Nov. 2005), pp. 1-28.

Ho, Alex et al., "Practical Taint-Based Protection Using Demand Emulation" EuroSys '06, Apr. 18-21, 2006, Leuven, Belgium, ACM © 2006, 13 pages.

\* cited by examiner

TAINT TRACKING MECHANISM FOR COMPUTER SECURITY

CROSS-REFERENCE TO RELATED APPLICATION(S)

This application is a continuation of U.S. application Ser. No. 11/529,796, filed Sep. 29, 2006, which issued as U.S. Pat. No. 8,510,827 on Jul. 24, 2013, which claims the benefit of, and priority under 35 U.S.C. §119(e) to U.S. Provisional Application No. 60/747,640, filed May 18, 2006.

BACKGROUND

1. Field of the Invention

The present invention relates generally to computational systems and, more particularly, to security techniques for characterizing or categorizing, and (in some cases) interdicting, information flows that present possible security risks.

2. Description of the Related Art

The vulnerability of computer systems, configurations, software and information codings and protocols to unauthorized access or use is widely recognized, at least by information security professionals. In general, these vulnerabilities can range from minor annoyances to critical national security risks. Today, given the ubiquitous nature of internet communications and the value of information and transactions hosted on the public internet, vulnerabilities are discovered and exploited at alarming rates. Automated tools facilitate the probing of systems and discovery of vulnerable systems and configurations. Once vulnerabilities are identified, exploits can be globally disseminated and rapidly employed.

Often, exploits seek to compromise security by introducing into a target system, data that can or will be interpreted by the target system in a way that facilitates the attack. For example, one classic form of attack is the so-called buffer overflow attack, in which an exploit causes vulnerable code to write data to memory in such a way that locations beyond the ostensible write target are updated. Typically, the data written takes the form of an input string that includes data which, if successfully introduced into memory in a precise location, will be interpreted by executing code (typically privileged code) in a way that facilitates the exploit. For example, if a write operation improperly writes 2 KBytes of data to a 128 Byte data structure, memory locations may be updated beyond the data structure intended by the original programmer. If those memory locations include the stack or a pointer used by privileged code, an attacker may successfully alter an execution path of privileged code. Other exploits may modify data upon which privileged code relies. In any case, a precisely crafted input string can be used to compromise a computer system.

Vulnerability to such attack vectors generally results from poor programming practices and/or bugs. However, such vulnerabilities are surprisingly widespread in commercial off the shelf software. A majority of the most damaging internet "worms" have employed techniques that resulted in direct corruption of function-pointers. Two notable examples are the 1988 Morris Internet worm which exploited (amongst other vulnerabilities) an unchecked buffer write in the UNIX fingerd program and the 2003 Slammer worm which exploited a buffer overflow vulnerability in computers running Microsoft's SQL Server.

In general, the strategy (if not the specific vector) of such attacks is reasonably well understood and a variety of security techniques have been developed to detect and/or defeat some such attacks. Examples include stack canary techniques, such as employed in StackGuard™ (or StackGuard-inspired systems) and StackShield extensions to the Gnu C compiler, and constrained control-flow techniques, such as described by M. Abadi, M. Budiu, Ú. Erlingsson and J. Ligatti, *Control-Flow Integrity*, Microsoft Technical Report, MSR-TR-05-18 (October 2005) or proposed by V. Kiriansky, D. Bruening and S. Amarasinghe, *Secure Execution Via Program Shepherding*, in *Proc.* 11*th USENIX Security Symposium* (2002). However, techniques employed have typically required a binary-rewriting pass or worse, source code analysis.

Another security technique that has been proposed involves (1) modifications to processor hardware and related structures of a memory hierarchy to store and manage security tags and (2) modifications to operating system implementations to mark spurious input data. See e.g., G. E. Suh, J. Lee, D. Zhang and S. Devadas, *Secure Program Execution via Dynamic Information Flow Tracking*, in *Proceedings of the* 11*th international Conference on Architectural Support For Programming Languages and Operating Systems* (2004). Unfortunately, it is often not possible or practical to redesign CPUs (Central Processing Units) and modify operating systems.

Alternative techniques are desired.

SUMMARY

Mechanisms have been developed for securing computational systems against certain forms of attack. In particular, it has been discovered that, by maintaining and propagating taint status for memory locations in correspondence with information flows of instructions executed by a computing system, it is possible to provide a security response if and when a control transfer (or other restricted use) is attempted based on tainted data. In some embodiments, memory management facilities and related exception handlers can be exploited to facilitate taint status propagation and/or security responses. Taint tracking through registers of a processor (or through other storage for which access is not conveniently mediated using a memory management facility) may be provided using an instrumented execution mode of operation. For example, the instrumented mode may be triggered by an attempt to propagate tainted information to a register.

In some embodiments, an instrumented mode of operation may be more generally employed. Often, one or more executables are identifiable as consumers of data that is considered tainted. For example, data received from an untrusted source or via an untrusted path is often transferred into a memory buffer for processing by a particular service, routine, process, thread or other computational unit. Code that implements the computational unit may be selectively executed in an instrumented mode that facilitates taint tracking. In general, instrumented execution modes may be supported using a variety of techniques including a binary translation (or rewriting) mode, just-in-time (JIT) compilation/re-compilation, interpreted mode execution, etc. Using an instrumented execution mode and/or exception handler techniques, modifications to CPU hardware can be avoided if desirable.

In some realizations, a hardware virtualization system may be secured using techniques described herein. In some realizations, an instrumented execution mode of execution provided by a hardware virtualization system may support techniques described herein. For example, in a hardware virtualization system that supports runtime binary translation of executables for execution on underlying hardware, the binary translation mechanism can augment instruction sequences to test conditions related to taint status of operands and to propagate taint status as appropriate. Taint codings may be maintained by a virtualization layer in correspondence with virtualized CPU and/or memory operations. In some realizations, virtualization layer taint tracking support may be selectively enabled and disabled when desired and/or applied to a subset of executing computations.

In general, modifications to operating systems can be avoided, if desirable, by exploiting virtualization system facilities or DMA (Direct Memory Access) handlers to initially mark information from untrusted sources as tainted. In the case of some virtualization systems described herein, it is possible to secure execution of one or more unmodified guest operating systems and related unmodified application software on standard, unmodified commercial hardware.

These and other variations will be understood with reference to this specification and the claims that follow.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

Figure 1:
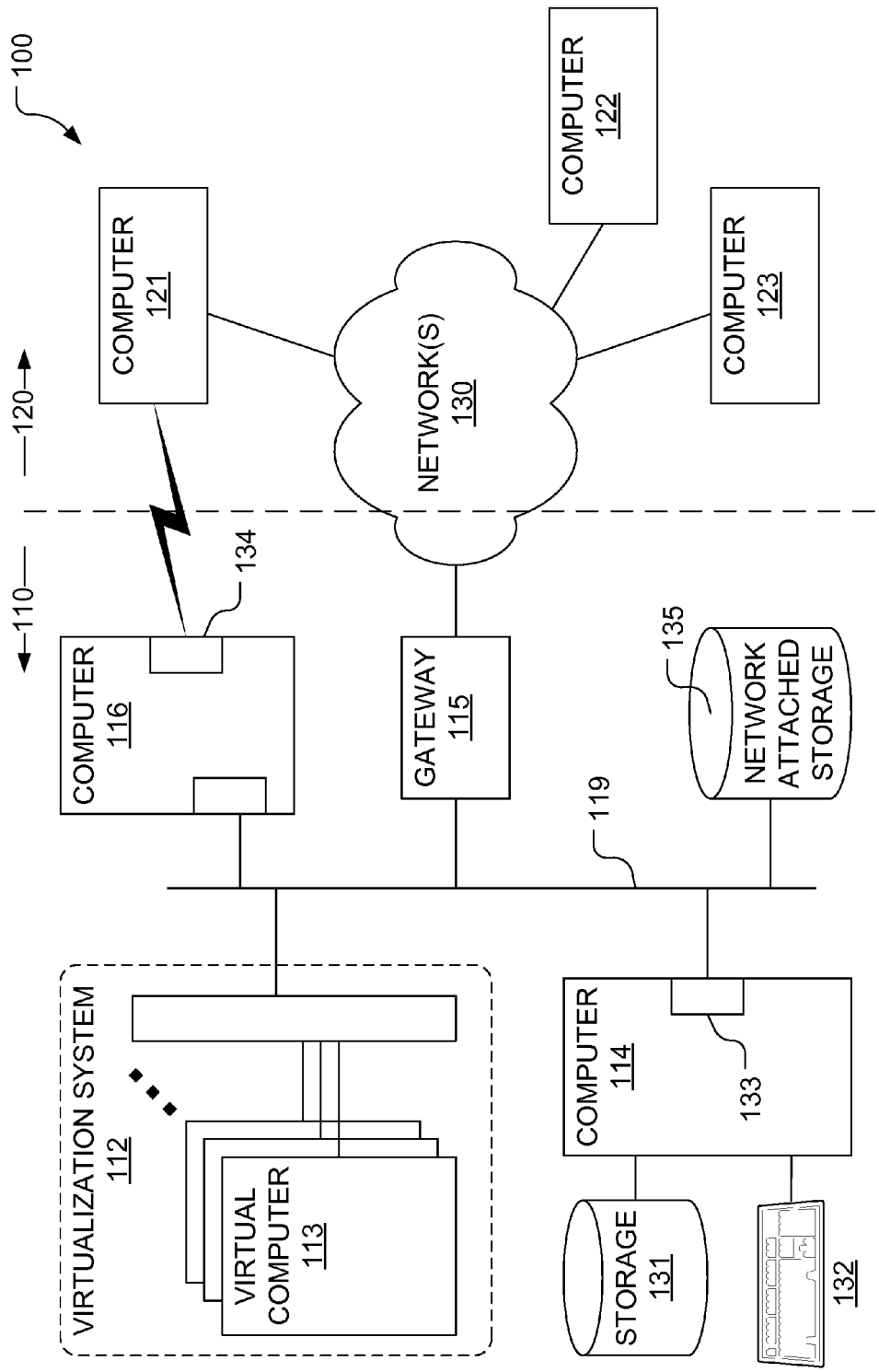
FIG. 1 depicts a network of computer systems in which techniques of the present invention may be employed.

DESCRIPTION OF THE PREFERRED
EMBODIMENT(S)

Mechanisms have been developed for configuring an intrusion detection system or other computer security mechanism to facilitate identification of possible exploitations of data introduced from untrusted sources. In particular, techniques have been developed for propagating a taint status for storage locations in correspondence with information flows of instructions executed by a computing system. In general, the method(s) by which we discover an attack can differ significantly from most conventional intrusion detection methods, which typically scan for signatures or require examination of source or binary code prior to execution. Instead, we identify input data from untrusted sources and take specific steps to track its propagation through storage to a point at which a restricted use of the data (or of derived data) may be consistent with an exploit attempt.

For example, in a secure (or security conscious) computational system, we would not ordinarily expect that the target of a control transfer instruction (e.g., a branch target, interrupt service routine, return address, etc.) would be introduced into a computation as input data. In particular, it would be particularly suspicious if input data received via a network communication from an untrusted remote system found its way into a memory location (or register) used by privileged code as a branch target or return address. Some of our techniques build on this insight to provide efficient mechanisms to propagate auxiliary information (typically a taint-status label) in correspondence with information flows of instructions executed in the computational system.

By propagating such auxiliary information or taint-status labels, we facilitate appropriate action if and when potentially suspect data is used in a way that (for a given security policy) is or could be restricted. Use as the target of a control transfer is a good illustrative example of such a restricted use. There are a wide variety of other possible restricted uses, however, which may be characterized more generally as restricted information flows or restricted data transfers. Thus, a control transfer may be considered a special case of a data transfer, such as a transfer of data into the instruction pointer of a CPU. Of course, based on the description herein, persons of ordinary skill in the art will appreciate a broad range of restricted use scenarios that may be appropriate for a particular implementation, deployment or security policy. For example, in some embodiments, it may be appropriate or desirable to restrict use of information having an associated taint status by an instruction or operation sequence that introduces information into an operating system data structure, portion of virtual/physical memory space, file system or software component that, consistent with a particular security posture or policy, could or should be protected. Use of tainted information as a format string by code that may be susceptible to a "format string vulnerability" can constitute a restricted use in some embodiments. Similarly, the passing of tainted information to a compiler, interpreter, or execution environment as code, script, command or as any identifier for any of the forgoing can constitute a restricted use in some embodiments.

While some embodiments in accordance with the present invention may interdict or prevent completion of a particular restricted use, for some embodiments, uses and/or security postures or policies, other less dramatic responses may be appropriate. For example, logging of the restricted use, escalation of a security posture, initiation of resource, process, user or other monitoring, and/or deployment of a honeypot may be appropriate with (or without) interdiction of a particular restricted use.

For concreteness, we describe implementations based on facilities, terminology and exploits typical of certain processor architectures and systems, and based on terminology and exploits typical of certain operating systems, virtualization systems and network protocols and/or services. That said, our techniques are general to a wide variety of processor and system architectures (including both single- and multi-processor architectures based on any of a variety of instruction set architectures), to numerous operating system implementations and to systems in which hardware may or may not be virtualized. In general, our techniques may be implemented in an operating system, in a virtual machine layer, using device firmware or drivers or combinations of the foregoing. In realizations implemented in a virtualization system (with or without hardware support), existing operating systems and applications may run unmodified. In realizations implemented in an operating system (with or without virtualization system and/or hardware support), existing applications may run unmodified. In general, our techniques do not require modification or recompilation of existing code deployments that are vulnerable to an exploit; however, certain realizations may employ runtime binary translation or dynamic recompilation of selected portions of existing code deployments as an efficient instrumented mode execution mechanism.

Accordingly, in view of the foregoing and without limitation on the range of underlying processor, hardware or system architectures; operating systems; or virtualization techniques that may be employed in realizations of the present invention, we describe our techniques primarily in the context of certain exemplary realizations. Based on these exemplary realizations, and on the claims that follow, persons of ordinary skill in the art will appreciate a broad range of suitable implementations and exploitations.

Exploits, Generally

In general, our techniques address many of the unwelcome side-effects of buggy or poorly-coded software that handles inputs. These side-effects, which can often be exploited in an attack, include:

function-pointer corruption;
data-pointer corruption; and
indirect data retrieval, corruption, or transmission via the introduction of misinterpreted data.

By function pointer we mean any pointer to code. In this sense, a branch target or return address is a type of function pointer. By "corruption," we mean that part or all of the information in an input is copied (possibly after several intermediate copies) or otherwise written into a register, memory cell, or other storage, that was not intended to store any part of the input at that time. This definition encompasses "buffer overrun" attacks, amongst others.

Function-Pointer Corruption

Historically, the majority of the most damaging "worms" have exploited this form of attack. The Morris Internet worm from 1988 and the more recent Slammer worm are two examples, and based on the description herein, other similar exploits will be understood by persons of ordinary skill in the art. Our techniques can be employed to detect function-pointer corruption attacks.

Data-Pointer Corruption

It is also undesirable to allow attackers to corrupt data pointers. Examples of exploits in which a data pointer is directly corrupted to later gain control of an application are well known, and based on the description herein, will be understood by persons of ordinary skill in the art. One notable example was published as *Bypassing StackGuard and Stack-Shield*, by Bulba and Kil3r, in Phrack Magazine, Volume 10 [0xa] Issue 56 [0x38] (May 2000), archived on the World Wide Web at phrack.org/phrack/56/p56-0x05. Our techniques can be used to detect such attacks.

Indirect Data Retrieval/Corruption/Transmission

The classes of attacks summarized above generally build upon an input that is misinterpreted because, contrary to programmer's intent, part or all of it is copied to an inappropriate place in the computer. For example, a return address on the stack can be overwritten by an input and a later machine instruction might then interpret part of that data as a code address. Of course, while such a sequence may be contrary to the intent of the operating system or application programmer, it can be exactly what a hacker intends.

It is also possible for bugs to allow data to be "misinterpreted" even when in an expected place in the computer. For example, some programs sloppily interpret a string as a set of formatting instructions when it is unsafe to do so; this class of vulnerabilities is sometimes called "format string vulnerability." Other programs may be exploited to execute a script, command or code specified by an input, typically at an inappropriate level of privilege.

Computational Systems, Generally

FIG. 1 depicts a network in which techniques of the present invention may be employed to secure any of a variety of computational systems against exploits such as described above. In particular, FIG. 1 illustrates a networked system 100 in which a collection of computational systems 110 interface with external and potentially untrusted computers 121, 122 and 123. In the illustrated configuration, an important source of inputs that may contribute to an exploit is the set of untrusted computers 121, 122 and 123 and users. However, more generally, exploits may come from other sources including computational systems, storage and devices inside a corporate firewall or local to a targeted machine. In general, computers 121, 122 and 123 and network(s) 130 are representative of any of a variety of systems and networks (and combinations thereof), local or globally distributed, that may supply information to a computational system via any of a variety of communication channels and/or protocols, including (but not limited to) those generally associated with the Internet. Eventually, such information is presented to one or more of the illustrated computational systems 110 as an input.

We refer generally to such information as an input and the data thereof need not be coded in any particular format. Indeed, we use the term input merely to identify a sequence of codes, symbols, characters, or numbers supplied (or received) as an input to a computational system. Persons of ordinary skill in the art will understand that information is often supplied (or received) encapsulated in packets or other information bearing units and coded/modulated/stored/represented in forms suitable to a particular transmission medium, storage form, etc. and is routinely decoded, transcoded, assembled, packetized, quantized, etc. in the course of manipulation and/or transfer. Therefore, the term input is meant to represent information content as eventually presented to a computational system without regard to any particular information coding, modulation, storage form, data representation etc. In particular, the information content of an "input" may at times span multiple packets, coding units, buffers, etc., particularly en-route to memory of a targeted computational system.

While many attack vectors originate from outside a local (and potentially trusted) network such as the network of computational systems 110, it is important to note that local systems, devices, storage and users may also constitute sources of input strings that constitute or contribute to an exploit. As a result, embodiments in accordance with the present invention may be concerned with input that are sourced from a local device (e.g., keyboard 132, network interface 133, modem or other communication device 134, etc.), local stores (e.g., local storage 131 or shared memory), networked devices (e.g., network attached storage 135 or storage area networks), and other computational systems, including those down the hall and across the globe.

Techniques of the present invention will be understood in the context of conventional hardware-oriented embodiments of these and similar systems and devices. However, in addition, we note that computational systems may be embodied as virtual computers 113 presented or emulated within a virtualization system such as virtualization system 112 executing on underlying hardware facilities. Virtualization systems are well known in the art and include commercial implementations, such as VMware® ESX Server™, VMware® Server and VMware® Workstation, available from VMware, Inc., Palo Alto, Calif. and operating systems with virtualization support, such as Microsoft® Virtual Server 2005, and open-source implementations such as available from XenSource, Inc.

Virtual machine technology can provide certain advantages. Amongst these advantages is the ability to run multiple virtual machines on an underlying hardware platform. Server consolidation exploits this advantage in an attempt to make better use of the capacity of the underlying hardware, while still ensuring that each user enjoys the features of a "complete" and apparently isolated computer. Depending on how a particular virtualization system is implemented, it can also provide greater security since the individual virtual machines can isolate potentially unstable or unsafe software so that it cannot adversely affect the hardware state or system files required for running the physical (as opposed to virtual) hardware. Although certain virtualization particular strategies/designs are described herein, virtualization system 112 is representative of a wide variety of designs and implementations in which underlying hardware resources are presented to software (typically to operating system software and/or applications) as virtualized instances of computational systems that may or may not precisely correspond to the underlying physical hardware.

Thus, computational systems in (or for) which techniques of the present invention may be employed include traditional hardware systems (such as computers 114 and 116), virtualized systems (such as virtualization system 112 and presented virtual computers and/or virtual machines 113) and/or combinations of the foregoing. In addition, functionality described herein may be distributed across devices or systems. For example, an initial labeling of tainted data may be performed upstream (in a data transfer sense) of a targeted system, e.g., at a gateway such as gateway 115 or computer 116. In some exploitations, a virtualization system can be employed to provision a virtual computer as a "host" for a gateway device or virtual appliance.

These and other exploitations will be understood with reference to the description that follows. We now turn to certain exemplary scanning and exception handling techniques.

Taint Tracking Facilities

Computational systems such as illustrated above typically receive inputs that are eventually stored in memory and/or presented to programs (including operating system software and/or application programs) executing within the computational system. In general, such inputs may be received via any of a variety of communication channels, device interfaces or data transfers. For example, some inputs may be received at a network interface card (NIC) and eventually transferred into memory of a computational system using techniques such as DMA. Other inputs may be received or accessed from data storage devices (such as disk, tape or other media) or from other storage (such as shared memory or device memory) or other I/O (Input/Output) devices such as a keyboard devices, modems, USB (Universal Serial Bus) devices, etc.

For purposes of the present invention, inputs may arrive from nearly any source and via nearly any path. Those inputs may contain (or encode) data suitable for use in an exploit. Of course, inputs usually encode legitimate data that is not part of any attack or exploit and which will never be misused or misinterpreted. In general, for at least some of the kinds of exploits of interest to us, it will not be possible to distinguish a priori between innocuous data and data that will later be employed in an exploit. For this reason, we have developed a strategy of identifying data of potential interest, tracking its propagation and instrumenting a computational system to at least detect inappropriate use. We illustrate a few scenarios in the context of FIGS. 2 and 3.

We select at least one suitable point for initially labeling information as "tainted." By tainted, we mean untrusted, suspect, potentially dangerous, malicious or otherwise of interest given a particular implementation, deployment, or security posture or policy. In general, appropriate taint criteria will be implementation dependent. For example, in some implementations, information may be considered tainted simply if it is not known to be completely trusted or if it is sourced from or transported via resources that are not completely trusted. In some implementations, information may be considered tainted based on some affirmative indicia of malice or based on information regarding compromised systems/networks or vulnerable protocols, services or interfaces. In some implementations, analysis of the data itself may contribute to taint characterization. In many implementations, taintedness can correspond to a multi-characteristic risk assessment, and may be based on fixed or variable criteria and/or single- or multi-level thresholds.

Handler-Based Facilities

Figure 2:
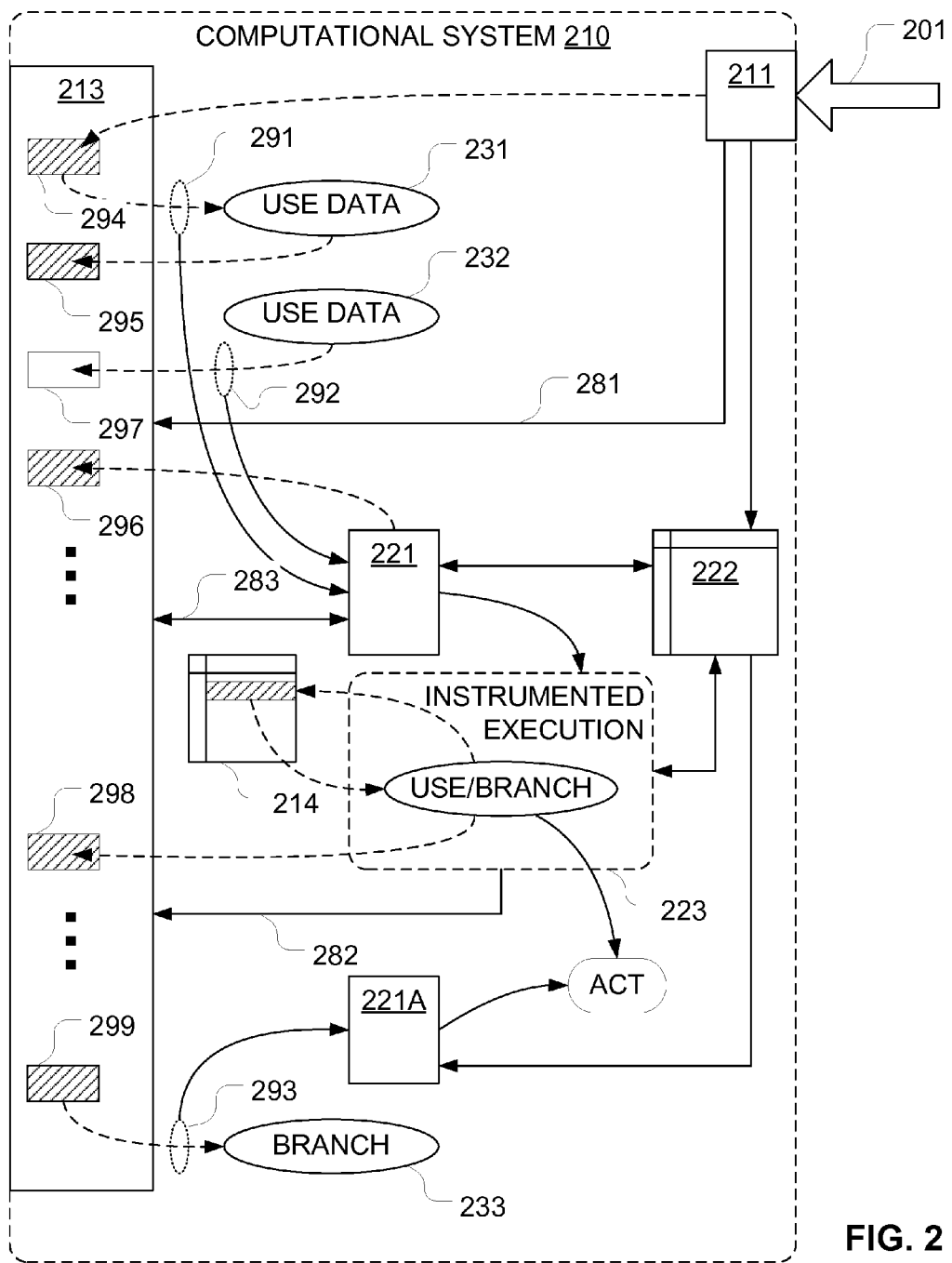
FIG. 2 illustrates the flow of input data that may constitute or contribute to an intrusion attempt, together with mechanisms in accordance with some handler-based embodiments of the present invention that may be employed to propagate and operate on taint status.

In some embodiments, we employ handler-based facilities to aid in the implementation of some of the taint propagation and restricted use detection mechanisms described herein. FIG. 2 illustrates at least one such embodiment. We identify a suitable point (e.g., labeling point 211) for initially labeling information as tainted. Often, the suitable labeling point resides in device driver or DMA handler software or in the implementation of a protocol stack or in a virtualization layer corresponding to any of the foregoing. In operating system or application software realizations, labeling points may be provided using input processing facilities of the operating system or application itself. However, because it is typically the operating system and applications that we seek to protect from exploits, it will often be preferable to label using facilities independent of the operating system or application itself. For this reason, virtualization layer facilities provide an attractive implementation site for performing initial labeling, for propagating taint information and for triggering responsive actions (if desired).

For simplicity of description, we illustrate a single labeling point in FIG. 2, although multiple points may be appropriate or desirable in some realizations. Labeling point 211 is representative of any suitable point along a data path via which data 201 (e.g., data received via a network or I/O interface or read from a file system) is transported to memory 213 accessible to a vulnerable program. Since, in general, data may be used and interpreted in a variety of ways and any given data may turn out to be innocuous, we typically do not interfere with normal information flows. Instead, we propagate taint labels in correspondence with information flows and configure our computational system to recognize a potentially inappropriate use.

In some embodiments, when information destined for a location (e.g., location 294) in memory 213 is initially characterized as tainted, a store 222 of tainted locations is updated and memory subsystems associated with memory 213 are configured to trigger an action in circumstances consistent with use or propagation of the tainted information. Typically, store 222 includes an identification of locations that are considered to be tainted. Often, store 222 will associate some characterization of the taint (e.g., level, type, source, confidence and/or aging information) with a given identification. In the illustrated case, we configure (281) subsystems associated with memory 213 to trigger an action if and when a tainted memory location is accessed. In general, we use any of a variety of techniques, including unmapping a corresponding memory page, marking a page as non-readable and/or non-writable, truncating a data segment or setting a breakpoint or watchpoint.

In some cases, the triggering mechanism we employ may be somewhat imprecise. Accordingly, we may use the appropriate handler mechanism, e.g., an exception, fault, trap, interrupt, breakpoint or other handler (shown generally as exception handler 221 or 221A) to evaluate the possibility that a particular exception 291, 292, 293 (i.e., a particular exception, fault, trap, interrupt, breakpoint or other event) was triggered by access to or use (231) of a location that we are tracking as tainted. In this way, a mechanism with relatively coarse-grain resolution, e.g., page-based memory management, can be used to trigger a finer-grained evaluation of whether a particular access or use involves tainted information. If a particular access or use involves an untainted location that resides on the same memory page as a tainted location, the handler may return and execution flow may continue normally.

In the illustrated case, exception handler 221 also evaluates whether a particular triggering access or use (e.g., 231) propagates taint. In general, rules regarding taint propagation are implementation dependent. Nonetheless, the following partial set is illustrative of a suitable rule set:

Instructions that copy data unmodified taint their destination if any source is tainted, and untaint their destination if all sources are untainted.

Instructions that write fixed results or results that are modified forms of their source operands always untaint their destination, even if one of their source operands is tainted.

Of course, more sophisticated propagation rules may be employed in some embodiments. For example, propagation decisions may take level, type or source of taint into account as well as confidence and/or aging information. Similarly, a more complex decision tree for evaluating instructions that generate results that are modified forms of their source operands can be employed. For example, instructions that perform simple arithmetic transformations (e.g., incrementing by a unit typical of pointer or indexing arithmetic) may be viewed as tainting their destination if a source operand is tainted.

In situations where propagation of taint is appropriate based on particulars (e.g., operand taint status and opcode) of a triggering instruction and based on dictates of an implemented rule set, exception handler 221 updates store 222 to reflect taint of the destination and configures/reconfigures (283) subsystems associated with memory 213 to trigger an appropriate action based on access to an updated set of tainted memory locations. Similarly, in situations where clearing of taint is appropriate, exception handler 221 updates store 222 and may reconfigure (283) subsystems associated with memory 213 to no longer trigger an action. Of course, an action triggering configuration (e.g., an unmapped page) may remain appropriate if another memory location (e.g., one residing on the same page) remains tainted.

FIG. 2 illustrates exception handler 221 completing an operation consistent with semantics of triggering use 231, thereby updating memory location 296. In general, completion of the triggering action (e.g., use 231) can be performed by the handler itself, although some embodiments may update taint tracking facilities and return control to the triggering use, which may itself perform the underlying operation (shown illustratively as an update of memory location 295). In general, clearing of taint, e.g., by overwriting previously tainted contents of a memory location with data that is untainted should be handled as well. Accordingly, exception handler 221 (or a similar handler) can also be triggered (see exception 292) based on taint of a destination (such as memory location 297) rather than a source. As before, completion of the triggering action (e.g., use 232) can be performed by the handler itself or by the underlying operation. In some embodiments, handler 221 may be implemented as multiple specialized handlers.

Certain uses of tainted information may constitute a "restricted use." As previously described, use of tainted data to specify the target of a control transfer may be restricted in some exploitations. Other restrictable uses may include use of tainted information by an instruction or operation sequence that introduces information into an operating system data structure, portion of virtual/physical memory space, file system or software component that, consistent with a particular security posture or policy, should be protected. For clarity of description, we illustrate in FIG. 2 the use of tainted information to specify the target of branch 233; however, based on the description herein, persons of ordinary skill in the art will appreciate a broad range of restricted use scenarios that may be appropriate for a particular implementation, deployment or security policy.

In the illustration of FIG. 2, subsystems associated with memory 213 are configured (based on taint propagation mechanisms described herein) to trigger an action if and when tainted memory location 299 is accessed. As before, triggering mechanisms employed in some configurations may not discriminate on a location-by-location basis, and we use a handler, e.g., an exception, fault, trap, interrupt, breakpoint or other handler 221A, to evaluate the possibility that exception 293 was triggered by use (in this case, use as a branch target specifier by branch 233) of a memory location that is tainted. Handler 221A consults store 222 for this purpose. As before, rules regarding taint can (in general) be implementation dependent. Nonetheless, an illustrative rule for handling certain control flows is:

Control flow instructions that read the new program counter from a tainted location result in an exception. For example, an undefined opcode exception could be overloaded.

In some embodiments, alternate rule sets may be deployed and other actions may be triggered, including logging of the restricted use, escalation of a security posture, initiation of resource, process, user or other monitoring, with (or without) interdiction. Of course, more sophisticated rules may be employed in some embodiments. For example, decisions may take level, type or source of taint into account as well as confidence and/or aging information. Additional or other uses of tainted information may be restricted in some embodiments. In some embodiments, handlers 221 and 221A are implemented as a single handler.

Instrumented Execution Mode for Taint Tracking Through Register Storage

While the preceding description has focused on handler-based mechanisms for propagating taint and restricting use of tainted information, it should be noted that in many computational systems not all storage accesses are conveniently mediated using handler mechanisms. For example, while many conventional memory subsystems may be configured in ways that support our techniques to provide coverage for tainted memory locations, these mechanisms do not provide coverage for accesses that involve register storage. Since tainted data may propagate through registers and since restrictable uses (including branches) may source operands from tainted registers, we employ additional techniques to provide register coverage. These additional techniques may be employed to cover other forms of storage, including some or all of the memory storage, if desired.

Some of the instructions that use tainted data and which trigger handler 221 may propagate taint to register storage of computational system 210 (illustrated in FIG. 2 as registers 214). In such cases, handler 221 initiates an instrumented execution mode 223 that facilitates taint tracking at least while register storage contains tainted data. In general, instrumented execution modes dynamically augment the functionality of executable/executing code and may be supported using a variety of techniques including a binary translation (or rewriting) mode, just-in-time (JIT) compilation/re-compilation, interpreted mode execution, etc. For register coverage, instrumented execution modes provide a mechanism for augmenting instruction sequences to test conditions related to taint status of register operands and to propagate taint status (as appropriate) for information transferred to register and non-register storage.

As with the handler-based mechanisms described above, a set of taint propagation and use restriction rules are implemented. For purposes of illustration, we assume rules similar to those described above. Therefore, in an illustrative embodiment, a sequence that includes a first instruction that copies data without modification is augmented with additional instructions (or other functionality) to propagate taint status from the source to the destination of the first instruction. Similarly, a sequence that includes a second instruction that modifies data is augmented with additional instructions (or other functionality) to untaint the destination of the second instruction regardless of the taintedness of its source(s). Thus, the additional instructions operate to update store 222 and, if the destination of the first or second instruction is memory 213, may reconfigure (282) subsystems associated therewith to trigger (or no longer trigger) an action consistent with taint status updates.

As with the handler-based mechanisms described above, certain instructions (e.g., control transfer instructions that use tainted data as a branch target or return address) may be subject to use restrictions. Therefore, a sequence that includes a control transfer instruction is augmented with additional instructions (or other functionality) to check taint status for the memory location or register that contains a branch target or return address for the control transfer instruction. If tainted data is used as a branch target or return address, an appropriate action is triggered. As before, a variety of actions may be triggered including logging of the restricted use, escalation of a security posture, initiation of resource, process, user or other monitoring, with (or without) interdiction.

In general, computational system 210 remains in instrumented mode (and the original instruction sequences of deployed code are augmented) for at least so long as registers 214 contain tainted data. In some embodiments, it may be desirable to disable handler-based mechanisms while operating in instrumented mode. Once all registers 214 are free of taint, computational system 210 may revert to handler-based facilities for taint tracking.

Comprehensive Taint Tracking Using Instrumented Execution

Figure 3:
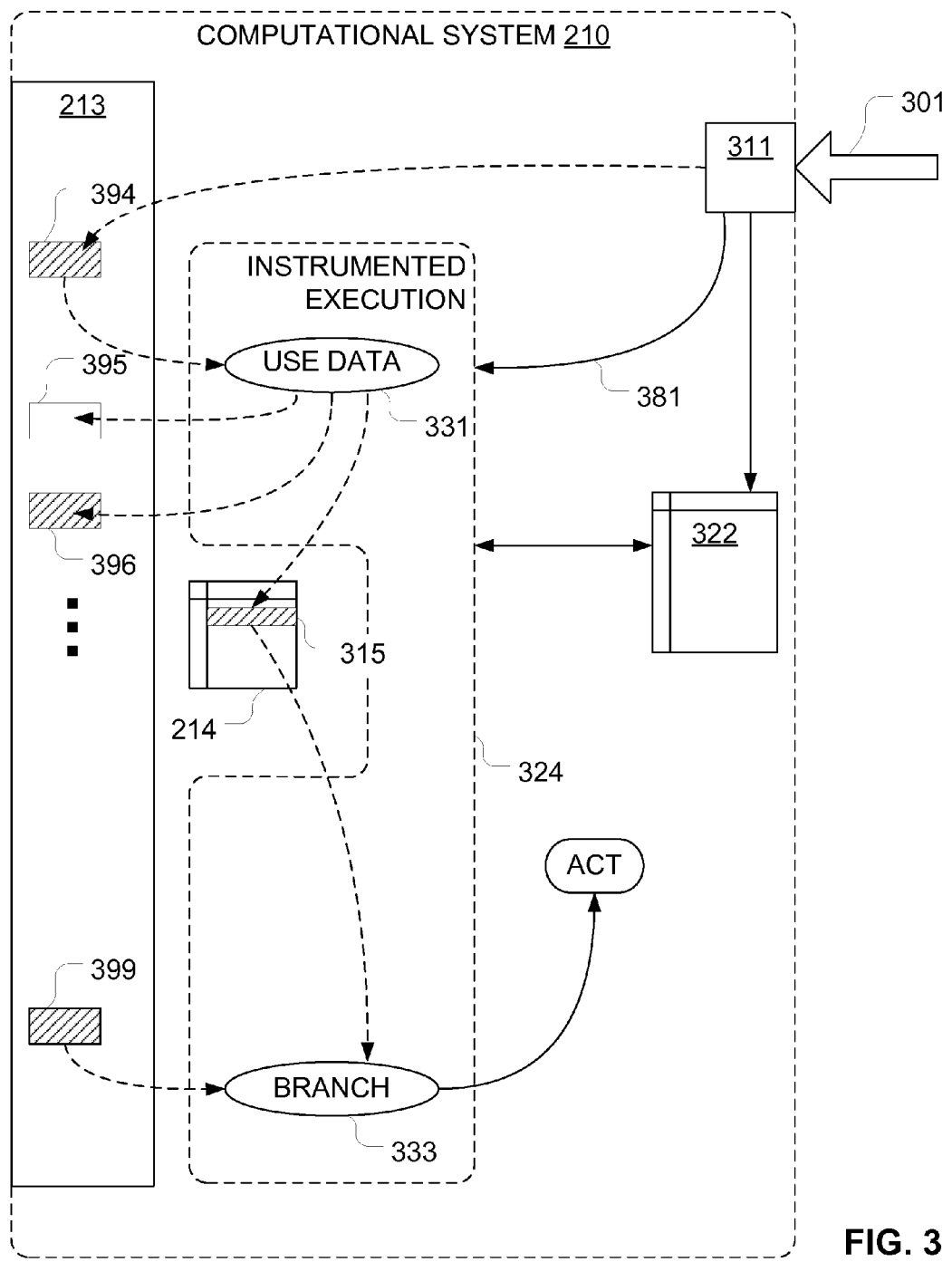
FIG. 3 illustrates the flow of input data that may constitute or contribute to an intrusion attempt, together with mechanisms in accordance with some instrumented execution-based embodiments of the present invention that may be employed to propagate and operate on taint status.

While the illustration of FIG. 2 builds upon both handler-based mechanisms (for coverage of memory) and additional mechanisms that provide an instrumented execution mode (for coverage of other storage, particularly register storage), based on the description herein, persons of ordinary skill in the art will appreciate that some embodiments may employ instrumented execution mode mechanisms to provide coverage for register as well as memory accesses. FIG. 3 illustrates one such configuration.

As before, labeling point 311 is representative of any suitable point (or points) along a data path via which data 301 (e.g., data received via a network or I/O interface or read from a file system) are transported to memory 213 accessible to a vulnerable program. When information destined for a location (e.g., location 394) in memory 213 is initially characterized as tainted, store 322 of tainted locations is updated. Typically, store 322 includes an identification of locations that are considered to be tainted. Often, store 322 will associate some characterization of the taint (e.g., level, type, source, confidence and/or aging information) with a given identification. Whereas the realization illustrated in FIG. 2 configured memory subsystems to trigger exceptions upon access to spans of memory locations that at least covered the tainted locations, the system of FIG. 3 simply initiates an instrumented execution mode for relevant code.

As before, instruction sequences are augmented to check and propagate taint status of accessed storage and, in the case of restricted uses, to trigger appropriate action. However, unlike the exploitation of FIG. 2, that illustrated in FIG. 3 employs instrumented execution mode techniques for coverage of memory 213 as well as register storage 214. Once labeling point 311 initially characterizes an input as tainted, instrumented execution is triggered (381) for a relevant set of executable code. While the relevant set is, in general, situation- and perhaps implementation-dependent, it is often possible to identify a code base to which a tainted input is supplied. For example, information received at a network interface card is typically introduced into a memory buffer read by code that implements a particular service or protocol stack. Accordingly, the code base that implements the particular service or protocol stack can be designated for instrumented mode execution. Of course, larger or smaller portions of a code base may be designated for instrumented mode execution. For example, in some implementations, all or a substantial portion of the code base executing within a particular virtual machine may be executed in an instrumented mode.

In the illustration of FIG. 3, a particular code base 324, e.g., that which implements the ftp service, is designated for instrumented execution mode. As before, instrumented execution modes may be supported using a variety of techniques including a binary translation (or rewriting) mode, just-in-time (JIT) compilation/re-compilation, interpreted mode execution, etc. In some virtualization system-based embodiments, a virtualization layer is an attractive mechanism to mediate instrumented execution using, for example, runtime binary translation of guest operating system and/or application code.

In general, a sequence that includes a first instruction (e.g., use 331) that copies data without modification is augmented with additional instructions (or other functionality) to propagate taint status from the source to the destination of the first instruction (e.g., from memory location 394 to memory location 396 or register 315). The additional instructions interact with store 322 to check and propagate taint status. Similarly, a sequence that includes a second instruction that modifies data is augmented with additional instructions (or other functionality) to untaint the destination (395) of the second instruction regardless of the taintedness of its source(s).

As before, certain instructions (e.g., control transfer instructions that use tainted data as a branch target or return address) may be subject to use restrictions. Therefore, a sequence that includes a control transfer instruction (e.g., branch 333) is augmented with additional instructions (or other functionality) to check taint status for the memory location (399) or register (315) that contains a branch target or return address for the control transfer instruction. If tainted data is used as a branch target or return address, an appropriate action is triggered.

Virtualization System Embodiments

As described elsewhere herein, techniques in accordance with the present invention may be exploited in various hardware and software embodiments, including those in which device driver/handler and/or operating system support is adapted to perform the described methods. Nonetheless, as also described herein, virtualization systems present an attractive implementation framework. In particular, in implementations or deployments where use of "off-the-shelf" applications, operating systems and/or device interfaces is important or desirable, virtualization techniques may be adapted to introduce the desired initial taint labeling and event triggering/handling functionality without modifications to operating systems and/or device interfaces. In addition, runtime binary translation facilities of some virtualization systems may be employed to facilitate instrumented execution modes.

Figure 4:
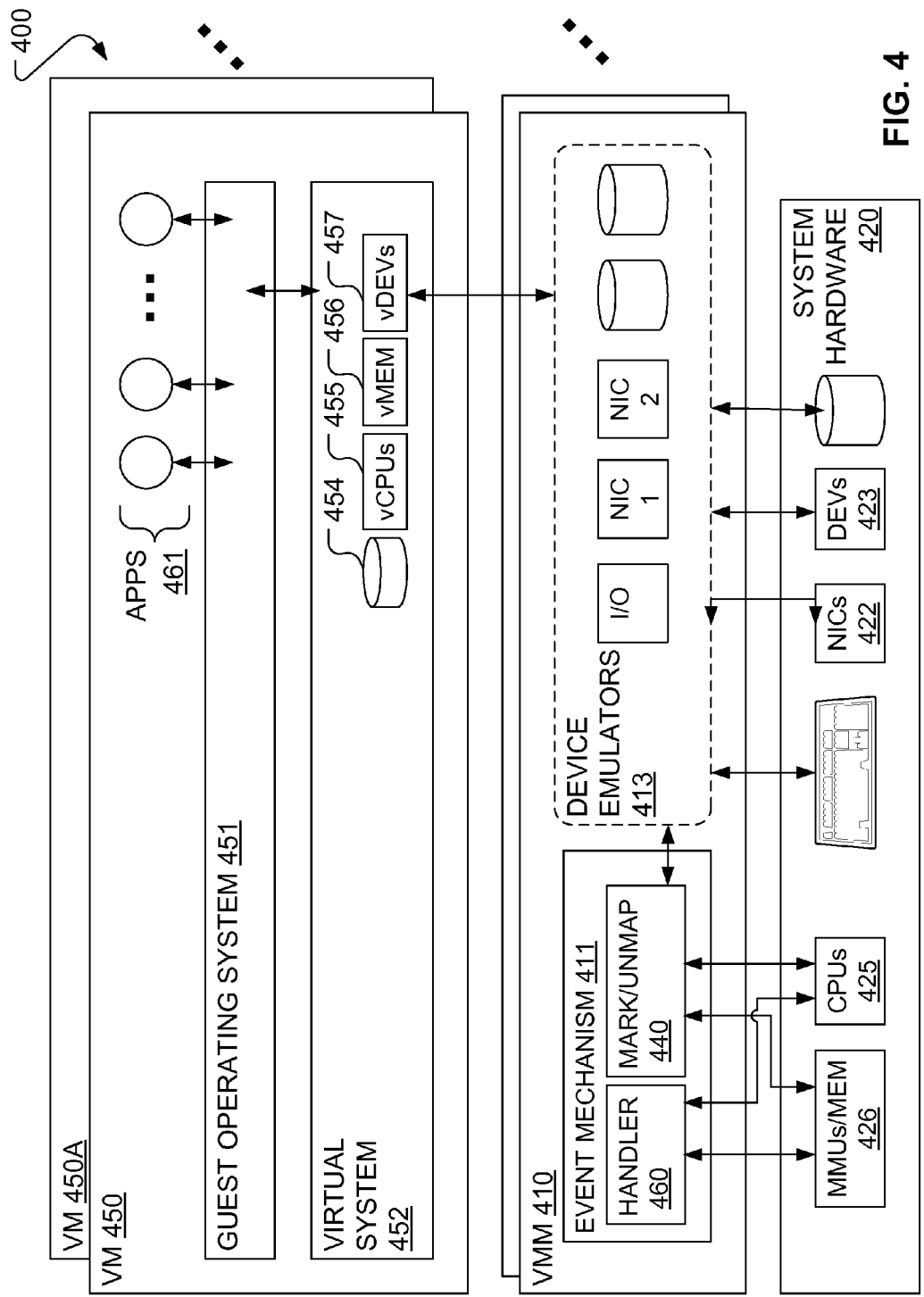
FIG. 4 is a functional block diagram of a virtualization system in which security techniques in accordance with some embodiments of the present invention may be employed.

FIG. 4 is a functional block diagram of a virtualization system 400 in which security techniques in accordance with some embodiments of the present invention may be employed.

Plural instances of virtual machines (e.g., VM 450, VM 450A) execute on underlying system hardware 420 in coordination with respective virtual machine monitors, VMMs 410. In the illustrated configuration, each virtual machine supports execution of a guest operating system by presenting a virtual system which, though at least partially emulated using software computations, appears to a guest to be a physical system. In particular, virtual machine 450 (operating in conjunction with functionality of a corresponding VMM) presents a virtual hardware system 452 to guest operating system 451, including software virtualizations of storage, processors, memory and devices (e.g., disk storage 454, vCPUs 455, vMEM 456 and vDEVs 457).

Numerous virtualized devices 457 are typically supported. In many cases, virtualized devices correspond to facilities provided by underlying hardware. For example, virtualizations of network interface (NIC) devices, I/O devices, and storage devices will typically be provided using corresponding underlying hardware facilities. In some cases, a virtual device may correspond precisely to a hardware device. However, correspondence need not be one-to-one. For example, M network interface card (NIC) virtualizations may, in general, be supported using N underlying hardware NICs, wherein M need not equal N. Furthermore, the interface presented to guest operating system 451 (as part of virtual system 452) need not precisely correspond to that provided by underlying hardware. For example, a virtualized device (e.g., a virtualization of a particular MBit Ethernet card) and underlying hardware that supports data transport (e.g., a particular FDDI card) may present very different interfaces. Furthermore, in some cases, a virtualized device need not correspond to hardware of any similar type. For example, in some realizations, a disk device may be emulated using shared memory.

Whatever the characteristics of a particular set of virtualized devices, software that implements the virtualization represents an attractive layer in which to perform the above-described initial labeling based on taint criteria. Therefore, in certain virtualization system embodiments in accordance with the present invention, labeling points (e.g., labeling point 211, 311, see FIGS. 2 and 3) may be introduced at any convenient point in data flows from underlying hardware to operating system and application software. Based on the identification of particular data as tainted (i.e., as untrusted, suspect, potentially dangerous, malicious or otherwise of interest given a particular implementation, deployment, or security posture or policy), we set up an appropriate action triggering mechanism using facilities of underlying hardware CPUs 425 and/or memory subsystems 426.

In handler-based embodiments, mark/unmap facilities 440 of event mechanism 411 identify ranges of memory locations (including ranges that span tainted locations represented in memory subsystem 426) for use in triggering an appropriate handler for checking and (if appropriate) propagating taint and/or triggering action based on a restricted use. In the illustrated configuration, mark/unmap facilities 440 of event mechanism 411 also configure the computational system to throw an exception (e.g., exceptions 291, 292 and 293, shown in FIG. 2) in situations that may correspond to propagation of taint or a restricted use. As before, we use any of a variety of techniques, including unmapping a corresponding memory page, marking a page as non-readable and/or non-writable, truncating a data segment, or setting a breakpoint or watchpoint. In the illustration of FIG. 4, mark/unmap facilities 440 configure memory subsystems 426 and/or CPUs 425. Typically, existing handler mechanisms (e.g., page fault handlers, exception handlers, breakpoint handlers, etc.) otherwise provided for memory management and/or debug may be augmented to include code (or control transfers to code) implementing the functionality described herein. In the illustrated configuration, corresponding handlers 460 (e.g., handlers 221 and 221A) are defined as part of event mechanism 411 and check for taint propagation and/or restricted uses of tainted information.

Propagation and Detection

In the preceding material, we have described certain exemplary detection strategies and possible implementations, including some that exploit facilities of memory subsystems, virtualization systems and/or underlying hardware mechanisms. Recognizing that the selection of any particular hardware and software environment is largely a matter of design choice, we now review functionality of some realizations without particular regard to any particular hardware/software architecture. In this regard, FIG. 5 includes flowcharts illustrating operation of certain intrusion detection and/or response mechanisms in accordance with some embodiments of the present invention.

Flow 540 depicts illustrative techniques in accord with some embodiments of the present invention. Input arrives from some source destined for some target storage location and downstream computation(s). A given input is considered tainted (or not) based on any of a variety of implementation-specific criteria. As previously described, by tainted, we mean untrusted, suspect, potentially dangerous, malicious or otherwise of interest given a particular implementation, deployment, or security posture or policy. In some implementations, inputs may be considered tainted based on source, target, interface, conveying protocol or transaction, or some combination of the foregoing. For example, in some implementations or configurations, all stmp and ftp protocol traffic arriving at a particular network interface card (hardware or virtualized) bearing a source address outside the corporate firewall could be considered tainted. In such a case, flow 540 may be implemented in firmware, device drivers and/or virtualization layer facilities to establish taint labeling for relevant input data as the tainted data are passed from buffers of a network interface card (physical or virtualized) to memory and downstream computations.

As previously described, we may consider an input to be tainted simply because it is not known to be completely trusted or because it is sourced from or transported via resources that are not completely trusted. Alternatively (or additionally), an input may be considered tainted based on some affirmative indicia of malice or based on information regarding compromised systems/networks or vulnerable protocols, services or interfaces. Analysis of the input data itself may contribute to taint characterization. Often a level or degree of taint may be ascribed.

In general, the illustrated flow (540) contemplates the possibility of a taint/no taint decision, or at least the possibility that some inputs (e.g., all received via a particular network interface) will be considered tainted and other inputs will not. However, it will be understood that, in some implementations or configurations, no individualized decision making need be provided for each input received or at any particular interface. In any case, inputs are eventually passed to downstream computations, typically via memory. Store 222 is updated to identify the stored-to location. In the illustrated configuration, we pass inputs to the computation whether or not an input is considered tainted. In this regard, initial labeling need not be implemented on a critical information flow path. Indeed, in some realizations, taint consideration may be performed asynchronously with respect to the basic information transfer.

If an input is considered tainted, we setup (542) an event trigger for later use in triggering taint propagation, restricted use monitoring and/or instrumented modes of execution for a relevant set of computations. We also store (543) a taint descriptor in store 222 for later use. Any of a variety of descriptors may be suitable depending on particular security threats/vulnerabilities of concern and propagation and restricted use behaviors that we wish to provide; however, for purposes of illustration, we have selected descriptors that may be used for very simple (and computationally efficient) discrimination between tainted and untainted data. Accordingly, in some realizations, store 222 codes entries that enumerate identifiers for those locations (memory and/or register) that are currently considered tainted.

Any of a variety of data structures may be used to encode store 222 for efficient storage and access. In some embodiments, a simple ordered set of identifiers may be maintained to identify memory addresses and/or register identifiers considered tainted. Skip-lists, content addressable stores and/or hash tables may be used in some implementations to support efficient lookup. In some embodiments, tuple instances such as <identifier, label> may be coded to provide more complex taint characterization (including multi-level taint) and handling. In some embodiments, aging (or time to live, ttl) information may be encoded in association with entries to facilitate efficient management of store 222 and/or to limit taint tracking overhead.

As previously described, any of a variety of event triggering mechanisms can be employed. For example, in handler-based embodiments, memory paging system attributes can be updated to trigger a handler on access to memory pages (or other storage units) that contain tainted data. Alternatively, or in addition, event triggering mechanisms can be employed to trigger actions for certain code. For example, a subset of all executable code may be relevant for inputs arriving via a particular interface or protocol. In such cases, it can be desirable to setup an execution trigger (e.g., using a breakpoint or memory system facility) to trigger an instrumented mode of execution for the relevant code subset.

Figure 5:
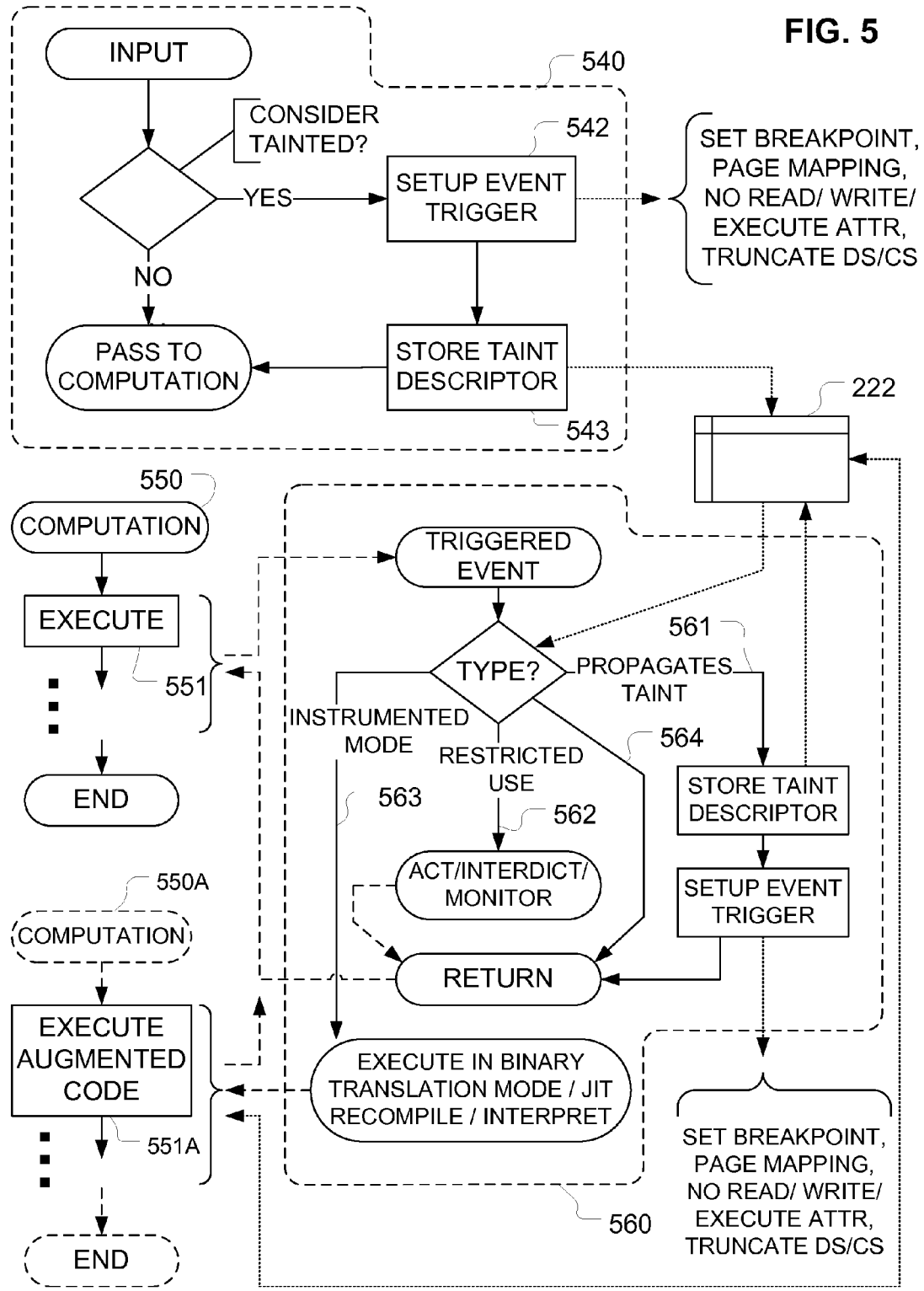
FIG. 5 includes flowcharts illustrating operation of certain security techniques in accordance with some embodiments of the present invention.

Building on our techniques, computation 550 (typically defined by application or operating system software, or by an applet, routine or other component thereof) is executed (551) without modification to the software. At some point during execution of the computation, flow 560 can be triggered based on the previously set event trigger. Typically, flow 560 interrupts execution of the computation pending diagnosis of the triggering event or to mediate transition to an instrumented mode of execution. The illustrated flow (560) is consistent with the illustration of FIG. 2 and contemplates the possibility that a particular event (associated with an instruction execution) may propagate taint (561), constitute a restricted use (562) of tainted information, implicate transition to an instrumented mode of execution (563) or be a false positive (564). However, it is also possible that, consistent with some embodiments in accord with FIG. 3, a transition to an instrumented mode of execution (563) may constitute the relevant triggered action. In such case, taint propagation and restricted use checks are performed by augmented code (see 551A), rather than in flow 560. In this regard, the flows of FIG. 5 are general to a variety of embodiments and at least some embodiments need not implement all flows illustrated. Accordingly, we describe the illustrated flows primarily in the context of handler-based embodiments. Nonetheless, based on that description, persons of ordinary skill in the art will appreciate other embodiments such as those based (in-whole or in-part) on instrumented execution mode taint propagation and restricted use handling.

In the illustrated case, we compare operands of the triggering instruction with a current enumeration (in store 222) of tainted locations. Based on the type of triggering instruction (e.g., the opcode, taint status of its operands and/or its target), we determine whether the triggering instruction propagates taint (561). If so, we store an appropriate descriptor and configure/reconfigure event triggers. Accordingly, in an implementation of simple taint propagation rules previously described, a triggering instruction that copies data without modification propagates taint status from a source to a target memory location by updating store 222 and setting up an appropriate event trigger for coverage of any newly tainted memory location. Similarly, a triggering instruction that modifies data untaints its target location regardless of the taintedness of its source(s). Accordingly, flow 560 updates store 222 (if necessary) to clear any target location taint label and reconfigure/remove any now extraneous event trigger before returning control to computation 550.

If the triggering instruction constitutes a restricted use (562) of tainted information, we take whatever implementation- or security-policy-dependent action is appropriate. In some embodiments, if the triggering instruction is a control transfer instruction that reads a branch target or return address from a location identified by store 222 as tainted, we throw an undefined opcode exception. However, more generally, it may be appropriate to log the restricted use, escalate a security posture, initiate resource, process, user or other monitoring (with or without interdiction), throw some other exception, trigger some other event, etc.

If the triggering instruction implicates transition to an instrumented mode of execution (563) we make the transition using whatever implementation-dependent facility is appropriate. For example, in some implementations that employ an instrumented execution mode for coverage of taint propagation through register (or other non-memory) storage, we identify taint propagating triggering instructions that target register (or other non-memory) storage and initiate an instrumented execution mode to dynamically augment the functionality of executable/executing code of computation 550. In the illustration of FIG. 5, dynamically augmented code is executed (551A) as an instrumented mode computation 550A corresponding to the base computation 550 which includes the triggering instruction. In general, the instrumented mode of execution can be supported using any of a variety of techniques including a binary translation (or rewriting) mode of virtualization system operation, using just-in-time (JIT) compilation/re-compilation, or using an interpreted or stepped mode of execution. As described in greater detail above, instrumented execution modes provide a mechanism for augmenting instruction sequences to test conditions related to taint status of register operands and to propagate taint status (as appropriate) for information transferred to register and non-register storage.

Of course, if operands of the triggering instruction do not match a tainted location entry in store 222 and no taint propagation, use restriction or transition to instrumented execution mode is implicated, the triggering instruction is a false positive (564). In such case, flow simply returns to computation 550.

Variations and Extensions

While aspects of our techniques have been described with reference to particular sources or implications of "taint," particular propagation vectors, and restricted use definitions typical of an information security system targeted at detection, monitoring and/or interdiction of malicious (or at least errant) introduction of data for control flow alteration, the basic techniques have broad applicability. In general, some or all storage locations (e.g., memory, disk, registers, etc.) in a computational system can be labeled with additional information that enables additional functionality. The labeling can be implemented in a variety of ways, such as by having an extra bit for each word of storage, or with dynamically allocated data structures that record arbitrarily detailed information.

The labeling can be implemented in software when the storage in question is part of the virtual hardware of a virtual machine. Such implementations have several attractive features, such as the ability to run on stock hardware (versus, say, needing memory and/or register storage to include an extra bit per word). Also, if virtual hardware cannot touch the labels, e.g., because they are maintained by the virtualization layer, then it is possible to maintain correct labels even if the software running inside the virtual machine is malicious.

Taint tracking is an application of the above and typically divides storage into at least two categories: tainted and untainted. In some implementations, additional categories can be provided. The taint tracking implementations detailed herein also have rules that specify how to update the categories as the computer does things: a copy of a tainted value is tainted, a network packet from an untrusted source is tainted, etc. Based on the taint tracking frameworks detailed herein, persons of ordinary skill in the art will appreciate exploitations tuned for propagation of other sorts of labels and/or other derived functionality. For example, we can:

1. Label each storage location with the source of the bits in that location.
   where, by source, we could mean the network location whence the bits came. Then, when, viewing a web page, it would be possible to request that bits in my video RAM whose source was "ads.adserver.com" be displayed as black pixels.
   where, by source, we could mean "public," "confidential," or "top-secret." Then, when viewing a document, it would be possible to request that only "public" images embedded in it be displayed. OR
   where, by source, we could mean physical location, organization, or person from whence the bits came.
2. Label storage locations with timestamps.
3. Label storage locations with an estimate of the popularity of the data therein. For example, we could then view the nytimes.com homepage with overlays that indicate the estimated popularity of each story/link. OR
4. Label storage locations with arbitrary data and create an API for setting the rules that cause the labels to be updated as the computer does things.

These and other variations on label definitions and derived functionality may be implemented using techniques described herein.

Other variations and extensions include making taint-tracking adaptive in the sense that we turn it on or off depending on various events. In some computational systems or deployments, adaptiveness can be particularly useful because the cost of tracking the taints may be non-trivial.

Another possible variation accounts for aging or a time-to-live (ttl) or decay-oriented metric for taints. Let's define S-taint tracking for a set S as taint tracking where the possible taintedness of a storage location is a member of the set S. For the basic taint tracking techniques already described, S={tainted, untainted} and a given taint label is either propagated or not. In a taint tracking system that employs ttl, the taints can be transformed, e.g., decremented on copy, so that a copy of a datum with taint T gets taint T−1 (unless T is zero). In this way, taint decay can be provided. Of course, other propagation rules may also be employed. For example, in some systems (particularly those that propagate other forms of labels), longevity rather than decay may be the relevant temporal attribute and label incrementation may be desirable.

In an implementation that supports ttl-coded taint and decay type propagation (i.e. taint T gets taint T−1, unless T is zero), S={0, infinity} provides the basic taint tracking described herein, as the taint label remains unchanged (i.e. no decay) whether it indicates taint or not. Other relevant choices for S when using the T→T−1 ttl decay rule are {0, 1}, {0, 1 ... k}, {0, 1, infinity} and {0, 1 ... k, infinity}. Other sets S, such as {1, 4, 19}, are not possible because decrementing taint T would result in a value that is not contained in the set S.

Finally, while some of the embodiments described herein perform restricted use checks in conjunction with data use, other embodiments may perform such checks asynchronously. For example, in some embodiments, interdiction is less of a priority than monitoring/logging and such checks can be performed lazily. In addition, in some computational systems, facilities exist that allow system state rollback. As a result, checks for use of tainted data as a branch target or return address (of for any other restricted use monitored) may lag primary computations of the system and be performed asynchronously or in parallel with such computations.

Virtualization System Technology and Variations

As is well known in the field of computer science, a virtual machine (VM) is a software abstraction—a "virtualization"—of an actual physical computer system. FIGS. 1 and 4 illustrate aspects of exemplary virtualization systems in accordance with some embodiments of the present invention. In an effort to emphasize features relevant to the inventive concepts certain aspects of more complete virtualization system implementation have been abstracted.

Some interface is generally provided between the guest software within a VM and the various hardware components and devices in the underlying hardware platform. This interface—which can generally be termed "virtualization software"—may include one or more software components and/or layers, possibly including one or more of the software components known in the field of virtual machine technology as "virtual machine monitors" (VMMs), "hypervisors," or virtualization "kernels." Because virtualization terminology has evolved over time and has not yet become fully standardized, these terms (when used in the art) do not always provide clear distinctions between the software layers and components to which they refer. For example, "hypervisor" is often used to describe both a VMM and a kernel together, either as separate but cooperating components or with one or more VMMs incorporated wholly or partially into the kernel itself; however, "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs is sometimes included in the host OS itself.

Unless otherwise indicated, embodiments of the present invention may be used (and/or implemented) in (or in conjunction with) virtualized computer systems having any type or configuration of virtualization software. Moreover, certain illustrative embodiments in accord with the invention are described and illustrated primarily as including one or more virtual machine monitors (shown as component 410) that appear as separate entities from other components of the virtualization software. This is only for the sake of simplicity and clarity and by way of illustration. Differing functional boundaries may be appropriate for differing implementations. In general, for those embodiments of the present invention implemented in (or in conjunction with) a virtualized computer system, functionality and software components/structures described herein can be implemented in any of a variety of appropriate places within the overall structure of the virtualization software (or overall software environment that includes the virtualization software).

In view of the above, and without limitation, an interface usually exists between a VM and the underlying platform which is responsible for actually executing VM-issued instructions and transferring data to and from the memory and storage devices or underlying hardware. Subject to the foregoing, we illustrate a "virtual machine monitor" (VMM), shown as component 410 in a configuration described above. A VMM is usually a thin piece of software that runs directly on top of a host, or directly on the hardware, and virtualizes at least some of the resources of the physical host machine. The interface exported to the VM is then the same as the hardware interface of a physical machine. In some cases, the interface largely corresponds to the architecture, resources and device complements of the underlying physical hardware; however, in other cases it need not.

The VMM usually tracks and either forwards to some form of operating system, or itself schedules and handles, all requests by its VM for machine resources, as well as various faults and interrupts. An interrupt handling mechanism is therefore included in the VMM. As is well known, in the Intel IA-32 ("x86") architecture, such an interrupt/exception handling mechanism normally includes an interrupt descriptor table (IDT), or some similar table, which is typically a data structure that uses information in the interrupt signal to point to an entry address for a set of instructions that are to be executed when the interrupt/exception occurs. In the Intel IA-64 architecture, the interrupt table itself contains interrupt handling code and instead of looking up a target address from the interrupt table, it starts execution from an offset from the start of the interrupt when a fault or interrupt occurs. Analogous mechanisms are found in other architectures. Based on the description herein, interrupt handlers may be adapted to correspond to any appropriate interrupt/exception handling mechanism.

Although the VM (and thus applications executing in the VM and their users) cannot usually detect the presence of the VMM, the VMM and the VM may be viewed as together forming a single virtual computer. They are shown and described herein as separate components for the sake of clarity and to emphasize the virtual machine abstraction achieved. However, the boundary between VM and VMM is somewhat arbitrary. For example, while various virtualized hardware components such as virtual CPU(s), virtual memory, virtual disks, and virtual device(s) including virtual I/O devices are presented as part of the VM 450 for the sake of conceptual simplicity, in some virtualization system implementations, these "components" are at least partially implemented as constructs or emulations exposed to the VM by the VMM. One advantage of such an arrangement is that the VMM may be set up to expose "generic" devices, which facilitate VM migration and hardware platform-independence. In general, such functionality may be said to exist in the VM or the VMM.

Figure 6:
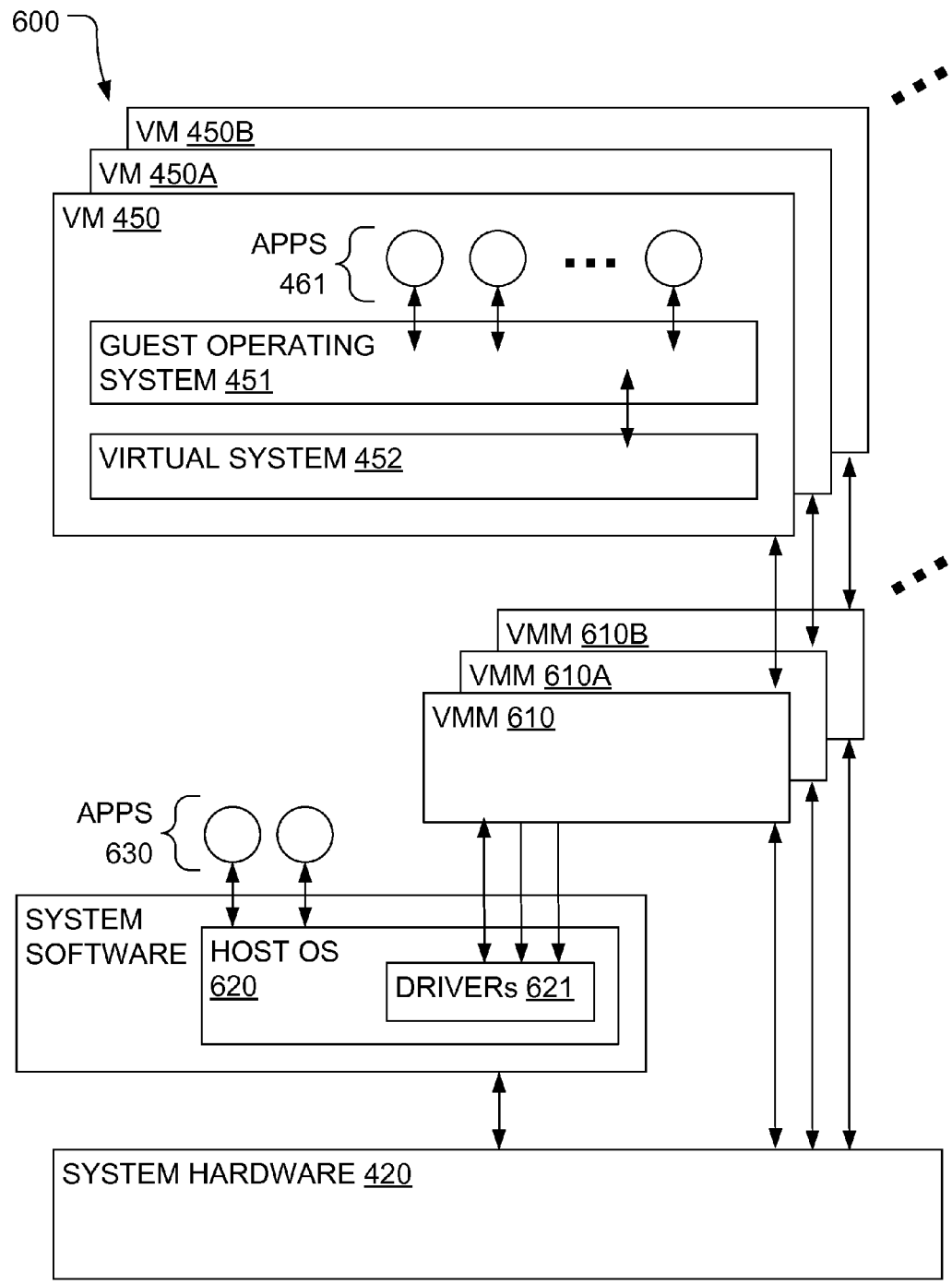
FIGS. 6 and 7 depict functional block diagrams of virtualization system configurations in accordance with respective exploitations of the present invention.
Figure 7:
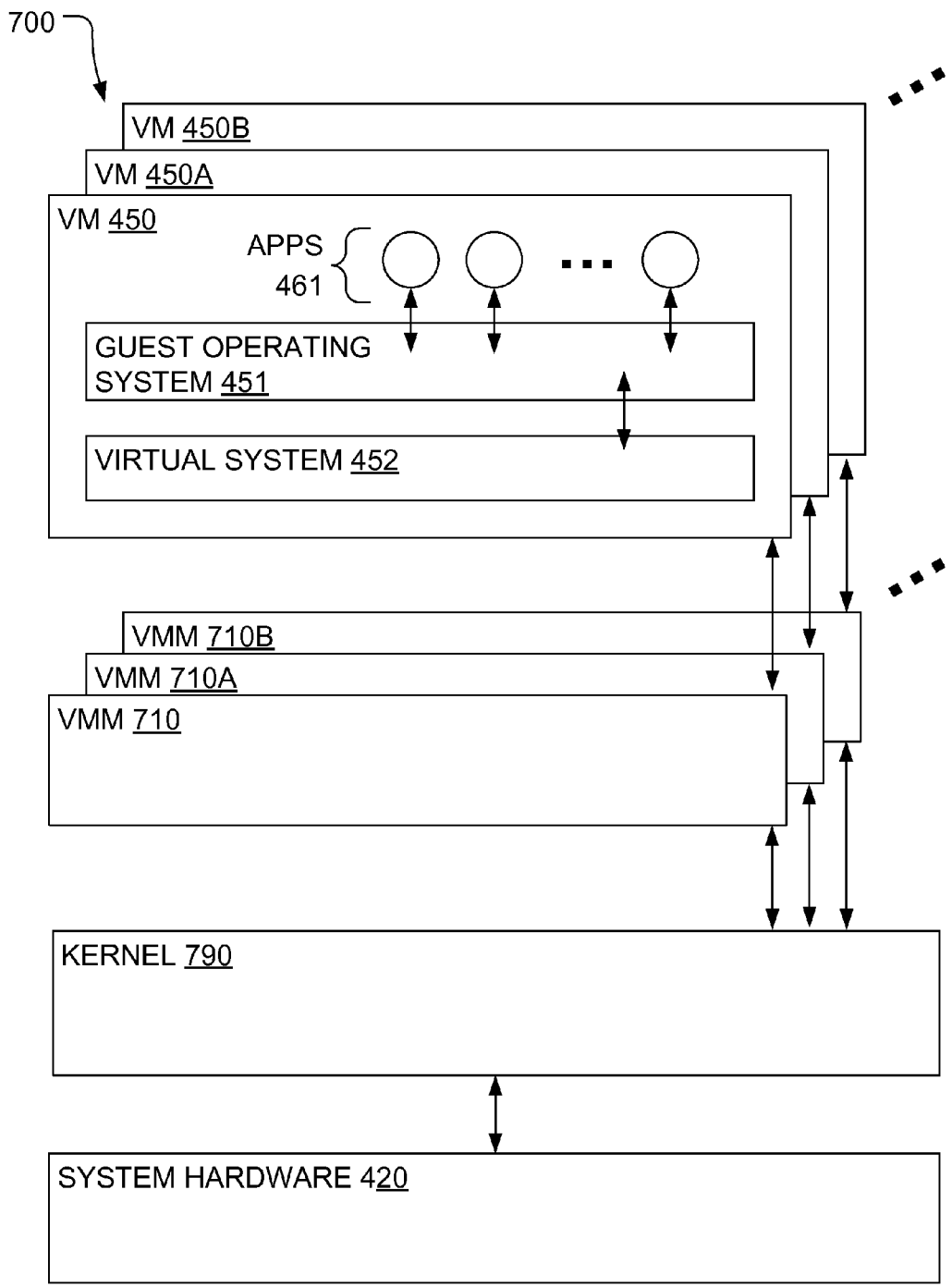

It should be noted that while VMMs have been illustrated as executing on underlying system hardware, many implementations based on the basic abstraction may be implemented. In particular, some implementations of VMMs (and associated virtual machines) execute in coordination with a kernel that itself executes on underlying system hardware, while other implementations are hosted by an operating system executing on the underlying system hardware and VMMs (and associated virtual machines) execute in coordination with the host operating system. Such configurations, sometimes described as "hosted" and "non-hosted" configurations, are illustrated in FIGS. 6 and 7. In the hosted configuration, an existing, general-purpose operating system (OS) acts as a "host" operating system that is used to perform certain I/O operations. In the "non-hosted" configuration, a kernel customized to support virtual computers takes the place of the conventional operating system.

Our techniques for scanning input strings for potentially dangerous subsequences and for configuring an exception handling mechanism to evaluate memory accesses and/or code executions for possible use of subsequences sourced from such an input string may be employed in either configuration. Accordingly, in view of the variations, two exemplary virtualization system configurations are summarized and, based on the preceding description, persons of ordinary skill in the art will appreciate suitable hosted and non-hosted implementations of the inventive concepts.

Hosted Virtual Computers

In FIG. 6, we illustrate a virtualization system configuration 600 commonly referred to as a "hosted" virtualized computer system in which a virtual machine monitor (e.g., VMM 610, VMM 610A, VMM 610B) is co-resident at system level with the host operating system 620 such that both the VMMs and the host operating system can independently modify the state of the host processor. VMMs call into the host operating system via driver 621 and a dedicated one of the user-level applications 630 to have the host OS perform certain I/O operations on behalf of the VM. The virtual computer in this configuration is thus hosted in that it runs in coordination with an existing host operating system. Virtualization systems that include suitable facilities are available in the marketplace. Indeed, GSX Server® virtual infrastructure software available from VMware, Inc., Palo Alto, Calif. implements a hosted virtualization system configuration consistent with the illustration of FIG. 6. VMware® Workstation desktop virtualization software, also available from VMware, Inc. also implements a hosted virtualization system configuration consistent with the illustration of FIG. 6. VMware and GSX Server are registered trademarks of VMware, Inc.

Non-Hosted Virtual Computers

In FIG. 7, we illustrate a virtualization system configuration commonly referred to as a "non-hosted" virtualized computer system in which a dedicated kernel 790 takes the place of and performs the conventional functions of a host operating system. Virtual computers (e.g., VM/VMM pairs) run on the kernel. Compared with a system in which VMMs run directly on the hardware platform, use of a kernel offers improved performance because it can be co-developed with the VMMs and optimized for the characteristics of a workload consisting of VMMs rather than a more general collection of tasks. Moreover, a kernel can also be optimized for I/O operations and it can facilitate provision of services that extend across multiple VMs (for example, for resource management). Virtualization systems that include suitable kernels are available in the marketplace. Indeed, ESX Server™ virtual infrastructure software available from VMware, Inc., Palo Alto, Calif. implements a non-hosted virtualization system configuration consistent with the illustration of FIG. 7. ESX Server is a trademark of VMware, Inc.

Different systems may implement virtualization to different degrees—"virtualization" generally relates to a spectrum of definitions rather than to a bright line, and often reflects a design choice in respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another concept, which has yet to achieve a universally accepted definition, is that of "para-virtualization." As the name implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software. For some, para-virtualization implies that the guest OS (in particular, its kernel) is specifically designed to support such an interface. According to this view, having, for example, an off-the-shelf version of Microsoft Windows XP as the guest OS would not be consistent with the notion of para-virtualization. Others define para-virtualization more broadly to include any guest OS with any code that is specifically intended to provide information directly to the other virtualization software. According to this view, loading a module such as a driver designed to communicate with other virtualization components renders the system para-virtualized, even if the guest OS as such is an off-the-shelf, commercially available OS not specifically designed to support a virtualized computer system.

Unless otherwise indicated or apparent, virtualized computer system-based realizations of the present invention are not restricted to use in systems with any particular "degree" of virtualization and are not to be limited to any particular notion of full or partial ("para-") virtualization.

Other Embodiments

While the invention(s) is (are) described with reference to various implementations and exploitations, it will be understood that these embodiments are illustrative and that the scope of the invention(s) is not limited to them. In general, taint propagation and event triggering techniques described herein may be implemented using facilities consistent with any hardware system or hardware systems hereafter defined. In addition, while our description of virtualization techniques has generally assumed that the virtual machines present interfaces consistent with a hardware system, persons of ordinary skill in the art will recognize that the techniques described may be used in conjunction with virtualizations that do not correspond directly to any particular hardware system. Virtualization systems in accordance with the present invention, implemented as hosted embodiments, non-hosted embodiments or as embodiments that tend to blur distinctions between the two, are all envisioned.

Many variations, modifications, additions, and improvements are possible. For example, while particular exploits and threat scenarios as well as particular security responses thereto have been described in detail herein, applications to other threats and other security responses will also be appreciated by persons of ordinary skill in the art. Furthermore, while techniques and mechanisms have been described using particular network configurations, hardware architectures, memory organizations and particular operating system constructs (typically IA-32 based architectures/systems and Windows operations systems) as a descriptive framework, persons of ordinary skill in the art will recognize that it is straightforward to modify such implementations for use in systems that support other processor instruction set architectures, other network or memory configurations and/or other operating system constructs.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A system comprising:
   a memory; and
   a processor programmed to:
      receive input data;
      determine that the input data untaints a destination of the input data if:
         all sources of the input data are untainted; or
         the input data comprises instructions that write fixed results or results that are modified forms of their source operands even if one of their source operands is tainted.

2. The system of claim 1, wherein the memory comprises a tainted location, and wherein the processor is further programmed to receive a request from code to propagate information from the tainted location to register storage in a register context, and wherein the processor is further programmed to:
   implement an instrumented mode of execution;
   augment the code with instructions to propagate a taint status through the register storage; and
   maintain the instrumented mode of execution until the register storage in the register context is considered not tainted.

3. The system of claim 1, wherein the memory comprises a tainted location, and wherein the processor is further programmed to receive a request from code to propagate information from the tainted location to register storage in a register context, and wherein the processor is further programmed to implement an instrumented mode of execution; and augment the code with instructions to identify the register storage in the register context as not tainted.

4. The system of claim 1, wherein the system further comprises a virtualization layer, and wherein the virtualization layer facilitates determining that the input data untaints a destination of the input data.

5. The system of claim 1, wherein the memory comprises a tainted location, and wherein the processor is further programmed to receive a request from code to copy information from the tainted location, and wherein the processor is further programmed to identify a destination of the copy of the information as tainted if any source of the information is tainted.

6. A method comprising:

receiving input data;

determining that the input data untaints a destination of the input data if:

all sources of the input data are untainted; or the input data comprises instructions that write fixed results or results that are modified forms of their source operands even if one of their source operands is tainted.

7. The method of claim 6, wherein a memory comprises a tainted location, and wherein the method further comprises receiving a request from code to propagate information from the tainted location to register storage in a register context, and wherein the method further comprises:

implementing an instrumented mode of execution;

augmenting the code with instructions to propagate a taint status through the register storage; and maintaining the instrumented mode of execution until the register storage in the register context is considered not tainted.

8. The method of claim 6, wherein a memory comprises a tainted location, and wherein the method further comprises receiving a request from code to propagate information from the tainted location to register storage in a register context, and wherein the method further comprises:

implementing an instrumented mode of execution; and augmenting the code with instructions to identify the register storage in the register context as not tainted.

9. The method of claim 6, wherein a memory comprises a tainted location, and wherein the method further comprises receiving a request from code to copy information from the tainted location, and wherein the method further comprises:

identifying a destination of the copy of the information as tainted if any source of the information is tainted; or identify a destination of the copy of the information as not tainted if all sources of the information are not tainted.

10. A non-statutory computer-readable storage medium comprising computer-readable instructions that cause one or more processors to perform the steps of:

receiving input data;

determining that the input data untaints a destination of the input data if:

all sources of the input data are untainted; or the input data comprises instructions that write fixed results or results that are modified forms of their source operands even if one of their source operands is tainted.

11. The non-statutory computer-readable storage medium of claim 10, wherein a memory comprises a tainted location, and wherein the computer-readable instructions further cause the one or more processors to perform the steps of:

receiving a request from code to propagate information from the tainted location to register storage in a register context;

implementing an instrumented mode of execution;

augmenting the code with instructions to propagate a taint status through the register storage; and maintaining the instrumented mode of execution until the register storage in the register context is considered not tainted.

12. The non-statutory computer-readable storage medium of claim 10, wherein the memory comprises a tainted location, and wherein the computer-readable instructions further cause the one or more processors to perform the steps of:

receiving a request from code to propagate information from the tainted location to register storage in a register context;

implementing an instrumented mode of execution; and augmenting the code with instructions to identify the register storage in the register context as not tainted.

13. The non-statutory computer-readable storage medium of claim 10, wherein the memory comprises a tainted location, and wherein the computer-readable instructions further cause the one or more processors to perform the steps of:

receiving a request from code to copy information from the tainted location;

identifying a destination of the copy of the information as tainted if any source of the information is tainted; or identify a destination of the copy of the information as not tainted if all sources of the information are not tainted.

* * * * *